United States Patent
Kotalwar et al.

(10) Patent No.: US 9,473,315 B2
(45) Date of Patent: Oct. 18, 2016

(54) NETWORK DEVICE CONFIGURED TO TRACK MULTICAST RECEIVERS

(71) Applicants: Alcatel-Lucent USA Inc., Murray Hill, NJ (US); Alcatel-Lucent Canada Inc., Ottawa (CA)

(72) Inventors: Jayant Kotalwar, Cupertino, CA (US); Andrew Dolganow, Ottawa (CA); Gitesh Patel, Fremont, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 72 days.

(21) Appl. No.: 14/454,271

(22) Filed: Aug. 7, 2014

(65) Prior Publication Data

US 2016/0043875 A1 Feb. 11, 2016

(51) Int. Cl.
*H04L 12/18* (2006.01)
*H04L 12/46* (2006.01)
*H04L 12/751* (2013.01)
*H04L 12/723* (2013.01)
(Continued)

(52) U.S. Cl.
CPC ............. *H04L 12/18* (2013.01); *H04L 12/185* (2013.01); *H04L 12/4633* (2013.01); *H04L 12/4641* (2013.01); *H04L 45/02* (2013.01); *H04L 45/16* (2013.01); *H04L 45/50* (2013.01); *H04L 47/10* (2013.01)

(58) Field of Classification Search
CPC ............................... H04L 12/46; H04L 12/18
See application file for complete search history.

(56) References Cited

U.S. PATENT DOCUMENTS

| | | | |
|---|---|---|---|
| 7,519,010 B1 * | 4/2009 | Aggarwal | H04L 12/18 370/254 |
| 7,751,405 B1 * | 7/2010 | Kompella | H04L 12/4633 370/254 |

(Continued)

FOREIGN PATENT DOCUMENTS

| | | |
|---|---|---|
| CN | 1852236 A | 10/2006 |
| CN | 101001194 A | 7/2007 |

(Continued)

OTHER PUBLICATIONS

R. Aggarwal et al., "Extranet in BGP Multicast VPN (MVPN)," Network Working Group, Internet Draft, Feb. 2010, 14 pages.

(Continued)

*Primary Examiner* — Afshawn Towfighi
*Assistant Examiner* — Lakeram Jangbahadur
(74) *Attorney, Agent, or Firm* — Ryan, Mason & Lewis, LLP

(57) ABSTRACT

A first network device adapted for communication with one or more other network devices is configured to originate a first route identifying a tunnel for carrying traffic for a multicast, to originate a second route specifying a leaf information requirement for the multicast but not identifying a tunnel for carrying traffic for the multicast, and to track a plurality of receivers of the multicast based at least in part on leaf information received from the multicast receivers responsive to the specified leaf information requirement of the second route. The first route may comprise an inclusive route having a tunnel attribute that identifies an inclusive tunnel for the multicast and the second route may comprise a selective route having a tunnel attribute configured to indicate that it carries no tunnel information. Multicast traffic can be switched between an inclusive tunnel and a selective tunnel responsive to the multicast receiver tracking.

21 Claims, 4 Drawing Sheets

(51) Int. Cl.
*H04L 12/801* (2013.01)
*H04L 12/761* (2013.01)

(56) References Cited

U.S. PATENT DOCUMENTS

| | | | |
|---|---|---|---|
| 7,756,072 | B1 | 7/2010 | Fenner et al. |
| 7,983,261 | B1 | 7/2011 | Aggarwal et al. |
| 8,571,029 | B1* | 10/2013 | Aggarwal ............... H04L 45/50 370/256 |
| 8,953,590 | B1* | 2/2015 | Aggarwal ........... H04L 12/4675 370/389 |
| 2011/0255536 | A1 | 10/2011 | Liu et al. |

FOREIGN PATENT DOCUMENTS

| | | |
|---|---|---|
| EP | 2512067 A1 | 10/2012 |
| WO | PCT/US2014/033126 | 7/2014 |

OTHER PUBLICATIONS

John Hardwick, "IP Multicast Explained," Data Connection Limited, Jun. 2004, 69 pages.

B. Fenner et al., "Protocol Independent Multicast—Sparse Mode (PIM-SM): Protocol Specification (Revised)," Network Working Group, Request for Comments: 4601, Aug. 2006, 112 pages.

D. Farinacci et al., "Anycast-RP Using Protocol Independent Multicast (PIM)," Network Working Group, Request for Comments: 4610, Aug. 2006, 12 pages.

Y. Rekhter et al., "A Border Gateway Protocol 4 (BGP-4)," Network Working Group, Request for Comments: 4271, Jan. 2006, 104 pages.

E. Rosen et al., "BGP/MPLS IP Virtual Private Networks (VPNs)," Network Working Group, Request for Comments: 4364, Feb. 2006, 47 pages.

J. De Clercq et al., "BGP-MPLS IP Virtual Private Network (VPN) Extension for IPv6 VPN," Network Working Group, Request for Comments: 4659, Sep. 2006, 18 pages.

E. Rosen et al., "Multicast in MPLS/BGP IP VPNs," Internet Engineering Task Force (IETF), Request for Comments: 6513, Feb. 2012, 88 pages.

R. Aggarwal et al., "BGP Encodings and Procedures for Multicast in MPLS/BGP IP VPNs," Internet Engineering Task Force (IETF), Request for Comments: 6514, Feb. 2012, 60 pages.

Juniper Networks, Inc., "NGEN MVPN BGP Route Types and Encodings, Examples for Easy Reference," www.juniper.net, Application Note, Nov. 2008, 4 pages.

Wikipedia, "Finite-State Machine," http://en.wikipedia.org/wiki/Border_Gateway_Protocol, Apr. 2013, 2 pages.

Alcatel-Lucent, "Alcatel-Lucent Data Sheet 7750 Service Router," Release 10, May 2012, 5 pages.

S. Bradner, "Key Words for Use in RFCs to Indicate Requirement Levels," Network Working Group, Request for Comments: 2119, Mar. 1997, 3 pages.

E. Rosen et al., "Wildcards in Multicast VPN Auto-Discovery Routes," Internet Engineering Task Force (IETF), Request for Comments: 6625, May 2012, 17 pages.

Alcatel-Lucent, "Next-Generation Layer 3 Multicast VPN (MVPN) Services," 2010, Application Note, 24 pages.

U.S. Appl. No. 13/859,367, filed in the name of P.G. Jain et al. filed Apr. 9, 2013 and entitled "Network Device with Tunnel Establishment Control Based on Site-Type Attribute Received from Other Network Device."

U.S. Appl. No. 14/067,547, filed in the name of Jayant Kotalwar filed Oct. 30, 2013 and entitled "Network Device Configured to Generate Empty Route for Limiting Number of Withdrawal Messages."

U.S. Appl. No. 14/247,595, filed in the name of J. Kotalwar et al. filed Apr. 8, 2014 and entitled "Network Device with Service and Client Routing Elements Configured to Support Any-Source Multicast Extranets."

\* cited by examiner

L = LEAF INFORMATION REQUIRED

NETWORK DEVICE CONFIGURED TO TRACK MULTICAST RECEIVERS

FIELD

The field relates generally to communication networks, and more particularly to communication protocols implemented using network devices of such networks.

BACKGROUND

Communication service providers often implement Virtual Private Networks (VPNs) for their customers. For example, VPNs may be provided using Internet Protocol (IP), Border Gateway Protocol (BGP) and Multiple Protocol Label Switching (MPLS) in accordance with the techniques disclosed in Internet Engineering Task Force (IETF) Request for Comments (RFC) 4364, entitled "BGP/MPLS IP Virtual Private Networks (VPNs)," which is incorporated by reference herein. The companion standard for VPNs in IPv6 networks is RFC 4659, entitled "BGP-MPLS IP Virtual Private Network (VPN) Extension for IPv6 VPN," which is also incorporated by reference herein. IP VPN services based on RFC 4364 and RFC 4659 have been deployed extensively by service providers around the world.

VPNs configured in accordance with RFC 4364 and RFC 4659 connect customer sites via tunnels, and allow IP unicast packets to travel from one customer site to another. However, these VPNs do not provide a way for IP multicast traffic to travel from one customer site to another.

The unicast VPN services defined in RFC 4364 and RFC 4659 can be extended to include the capability of handling IP multicast traffic, using the techniques disclosed in RFC 6513, entitled "Multicast in MPLS/BGP IP VPNs," which is incorporated by reference herein. VPNs configured in accordance with RFC 6513 are considered examples of what are more generally referred to herein as multicast VPNs (MVPNs). Such MVPNs are typically configured to support the transmission of IP multicast packets between customer sites using multicast tunnels.

SUMMARY

Conventional MVPN arrangements such as those defined by RFC 6513 can be problematic under certain circumstances. For example, these arrangements can be inefficient when an inclusive route has been originated by a multicast sender to allow multicast receivers to receive traffic for a multicast. In such an arrangement, all provider edge elements that are part of the inclusive route will receive the multicast traffic even if some of those provider edge elements have not actually joined the multicast by issuing a multicast join message. This is not only wasteful of network resources, but can also lead to difficulties when attempting to track multicast receivers.

Illustrative embodiments of the present invention overcome the above-noted problems associated with use of an inclusive route. Such embodiments advantageously provide explicit tracking of multicast receivers in MPLS/BGP IP VPNs as well in other communication network contexts. Moreover, such embodiments provide efficient techniques for switching multicast traffic between an inclusive tunnel of an inclusive route and a selective tunnel of a selective route responsive to multicast receiver tracking.

In one embodiment, a first network device adapted for communication with one or more other network devices is configured to originate a first route identifying a tunnel for carrying traffic for a multicast, to originate a second route specifying a leaf information requirement for the multicast but not identifying a tunnel for carrying traffic for the multicast, and to track a plurality of receivers of the multicast based at least in part on leaf information received from the multicast receivers responsive to the specified leaf information requirement of the second route.

By way of example, the first route may comprise an inclusive route having a tunnel attribute that identifies an inclusive tunnel for the multicast and the second route may comprise a selective route having a tunnel attribute configured to indicate that it carries no tunnel information.

The tunnel attribute of the selective route may be configured to indicate that it carries no tunnel information by setting a tunnel type field of the tunnel attribute to a predetermined value.

The inclusive and selective routes may more particularly comprise respective I-PMSI A-D and S-PMSI A-D routes, as will be described in greater detail elsewhere herein.

The specified leaf information requirement of the second route may be established by setting a leaf information field of a tunnel attribute of the second route to a predetermined value. As a more particular example, the leaf information field of the tunnel attribute of the second route may comprise a leaf information required flag that is set to a logic one value to indicate the specified leaf information requirement.

The first network device may be further configured to switch traffic for the multicast from the tunnel identified by the first route to a tunnel identified by the second route by updating the second route to identify a tunnel for carrying traffic for the multicast. The first network device can later switch traffic for the multicast from the tunnel identified by the second route back to the tunnel identified by the first route by updating the second route so as to no longer identify a tunnel for carrying traffic for the multicast.

The network devices in some embodiments may comprise respective routers or other provider elements associated with an IP-MPLS network, although it is to be appreciated that numerous other types of network devices and communication networks may be used in other embodiments.

DETAILED DESCRIPTION

Illustrative embodiments of the invention will be described herein with reference to exemplary communication networks, network devices and associated communication protocols. It should be understood, however, that the invention is not limited to use with the particular arrangements described, but is instead more generally applicable to any communication network application in which it is desirable to facilitate tracking of multicast receivers.

Figure 1:
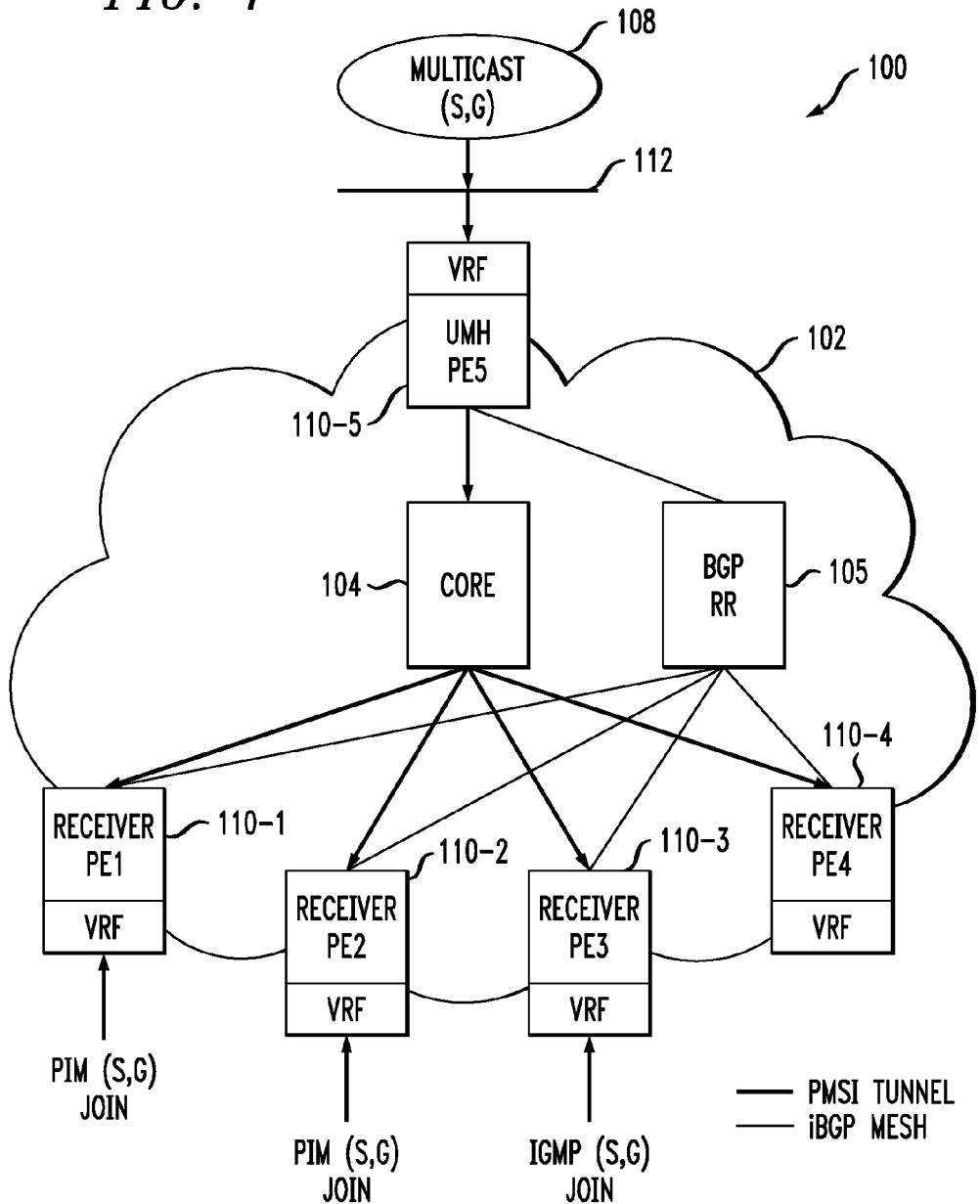
FIG. 1 shows a communication network that implements functionality for tracking multicast receivers in an illustrative embodiment of the invention.

FIG. 1 shows a communication network 100 that includes an IP-MPLS network 102 having a core 104 and a BGP route reflector (RR) 105. The IP-MPLS network 102 includes a multicast source 108 and a plurality of provider edge (PE) elements including PE elements 110-1, 110-2, 110-3, 110-4 and 110-5, also denoted as PE1, PE2, PE3, PE4 and PE5, respectively. The PE element 110-5 is coupled between the multicast source 108 and the core 104, although it may be separated from the multicast source by additional network devices not explicitly illustrated in the figure, as represented by the horizontal line 112.

Each of the PE elements 110 represents a site of at least one MVPN and can be characterized as being one of a sender-receiver site, a sender site, and a receiver site. More particularly, in this embodiment, PE element 110-5 is assumed to be a sender site of an MVPN and PE elements 110-1 through 110-4 are assumed to be respective receiver sites of that MVPN.

It is to be appreciated that this particular arrangement of site type designations is exemplary only, and further that the site type of a given PE element of the communication network 100 can change over time. Moreover, other embodiments may utilize additional or alternative sets of site types. Additional details regarding site types can be found in the above-cited RFC 6513.

Sender and receiver sites of an MVPN are examples of what are more generally referred to herein as a multicast sender and a multicast receiver, respectively.

A PE element closest to the source of a given MVPN is referred to as a root PE element of that MVPN. In the present embodiment, the root PE element of the MVPN is the PE element 110-5. As noted above, such a PE element may be connected directly to the source or connected via one or more network devices of one or more networks. A given tunnel carrying multicast traffic for the MVPN would originate at the root PE element.

A PE element that comprises or is associated with a receiver site of the given MVPN is referred to as a leaf PE element of that MVPN. A given tunnel carrying multicast traffic for the MVPN would terminate at a leaf PE element. The PE elements 110-1 through 110-4 are considered to be examples of leaf PE elements in the present embodiment.

Multicast tunnels established for a given MVPN make efficient use of network links by avoiding traffic replication to individual receiver sites. These tunnels are unidirectional with respect to multicast traffic. In accordance with RFC 6513, each site is generally required to establish connectivity via tunnels to respective peer sites. By way of example, tunnels that would ordinarily be established between PE pairs in accordance with RFC 6513 include P-tunnels of a Provider Multicast Service Interface (PMSI), which may comprise an Inclusive PMSI (I-PMSI) tunnel or a Selective PMSI (S-PMSI) tunnel. Such tunnels are used to build a multicast tree comprising the above-noted sender and receiver PE elements as respective root and leaf PEs of the multicast tree.

BGP routes and associated tunnel attributes can be advertised or otherwise transmitted by the given PE element to all other PE elements in the form of an I-PMSI or S-PMSI auto-discovery (A-D) route that includes a tunnel attribute identifying the I-PMSI or S-PMSI tunnel. Details regarding conventional aspects of BGP and A-D routes in the context of MVPNs are disclosed in RFC 6514, entitled "BGP Encodings and Procedures for Multicast in MPLS/BGP IP VPNs," which is incorporated by reference herein.

As indicated in FIG. 1, each of the PE elements 110 maintains a Virtual Routing and Forwarding (VRF) table. A given such table contains information characterizing routes between the corresponding PE element and other PE elements that are associated with a given MVPN. The VRF tables in the FIG. 1 embodiment may be viewed as examples of what are more generally referred to herein as "routing tables." A VRF table or other routing table of a given PE element may be considered part of a routing information base (RIB) of that PE element.

The VRF tables of the respective receiver PE elements 110 are utilized in processing multicast join messages, which in the present embodiment include (S, G) join messages each configured to originate a route to a source S of a multicast group G. These messages may be configured as Protocol Independent Multicast (PIM) messages or Internet Group Management Protocol (IGMP) messages, or combinations thereof as indicated in the figure, although other protocols could also be used.

The (S, G) join messages as shown in FIG. 1 are also commonly referred to as "source joins." Other types of join messages can be used, such as (*, G) join messages, also commonly referred to as "shared joins."

Although the multicast in FIG. 1 is illustratively an (S, G) multicast, multicast receiver tracking and related multicast traffic switching techniques disclosed herein are applicable to wide variety of other types of multicasts, including a (*, G) multicast, a (S, *) multicast and a (*, *) multicast, where * is a wildcard denoting an unspecified multicast source or multicast group. These latter three multicast types can more particularly include respective (C-*, C-G), (C-S, C-*) and (C-*, C-*) types of wildcard multicasts, where C-S and C-G denote respective multicast source and group addresses in customer space. For additional details, see RFC 6625, "Wildcards in Multicast VPN Auto-Discovery Routes," which is incorporated by reference herein.

The sender PE element 110-5 is also denoted in the present embodiment as an upstream multicast hop (UMH) node relative to the receiver PE elements 110-1 through 110-4. The receiver PE elements 110-1 through 110-3 receive respective PIM or IGMP join messages as indicated in the figure and originate corresponding join messages in order to establish routes to the multicast source 108 via the sender PE element 110-5. The BGP RR 105 receives the join messages from the receiver PE elements 110-1 through 110-3 and reflects them to the UMH sender PE element 110-5. These communications occur over an internal BGP (iBGP) mesh indicated as relatively thin interconnection lines in the figure. The BGP RR 105 serves as a peer for each of the PE elements 110, thereby avoiding the need for each of the PE elements to peer with each of the other PE elements in a full mesh arrangement. In this peering context, the BGP RR is also referred to as a route reflector server and the PE elements are referred to as respective route reflector clients.

The UMH sender PE element 110-5 updates its VRF table based on the join messages and sends multicast traffic received from the multicast source 108 to the receiver PE elements 110-1 through 110-4 via the multicast tree. The associated tunnels for the multicast traffic are shown in the figure as relatively thick interconnection lines illustratively denoted as PMSI tunnels.

It should be understood, however, that MVPNs herein are not limited to those configured in accordance with RFC 6513 or RFC 6514, and a wide variety of other MVPN arrangements can be used in embodiments of the invention.

The PE elements and multicast sources may be considered examples of respective nodes of the network 100. Numerous other types and arrangements of nodes may be used in other embodiments. Thus, for example, other types of provider elements may be used that are not necessarily PE elements. The term "node" as used herein is intended to be broadly construed, and accordingly may comprise, for example, an entire network device or one or more components of a network device.

The nodes of the communication network 100 may be fixed or mobile. Accordingly, various combinations of fixed and mobile nodes may be used in a given communication network, while other networks may comprise all fixed nodes or all mobile nodes. Each of the nodes in a given communication network may be configured in substantially the same manner, or different configurations may be used for different subsets of the nodes within a given network.

It is assumed for certain embodiments disclosed herein that each such node corresponds to a separate network device. The network devices may comprise routers, switches, computers or other processing devices, in any combination. A given network device will generally comprise a processor and a memory coupled to the processor, as well as one or more transceivers or other types of network interface circuitry which allow the network device to communicate with the other network devices. The PE elements 110 of the communication network 100 are therefore considered examples of what are more generally referred to herein as "network devices."

As mentioned previously, conventional MVPN arrangements such as those defined by RFC 6513 and RFC 6514 are problematic in that they fail to provide adequate techniques for multicast receiver tracking.

For example, in the context of the FIG. 1 embodiment, assume that provider element PE5 is sending multicast traffic for the (S, G) multicast on an I-PMSI tunnel. This multicast traffic is received by all of the other PEs that have joined that I-PMSI tunnel, illustratively PE1 through PE4. However, as indicated in FIG. 1, PE4 does not originate a join message for the (S, G) multicast. Therefore, PE4 receives multicast traffic despite having not originated a join message for the (S, G) multicast, leading to inefficient use of network resources and degraded network performance.

This problem is addressed in one or more embodiments of the present invention by, for example, configuring a network device to originate a separate route, illustratively an S-PMSI A-D route, for facilitating the tracking of multicast receivers and not for carrying multicast traffic. Such an arrangement helps to avoid the sending of multicast traffic to network devices that have not originated join messages for the corresponding multicast, thereby conserving network resources and improving network performance. For example, such an arrangement allows the multicast sender to accurately and efficiently determine the multicast receivers, and then if necessary to switch multicast traffic to a selective tunnel involving only those multicast receivers.

The multicast receiver tracking and related multicast traffic switching functionality of communication network 100 will now be described in greater detail with reference to FIGS. 2 through 5.

Figure 2:
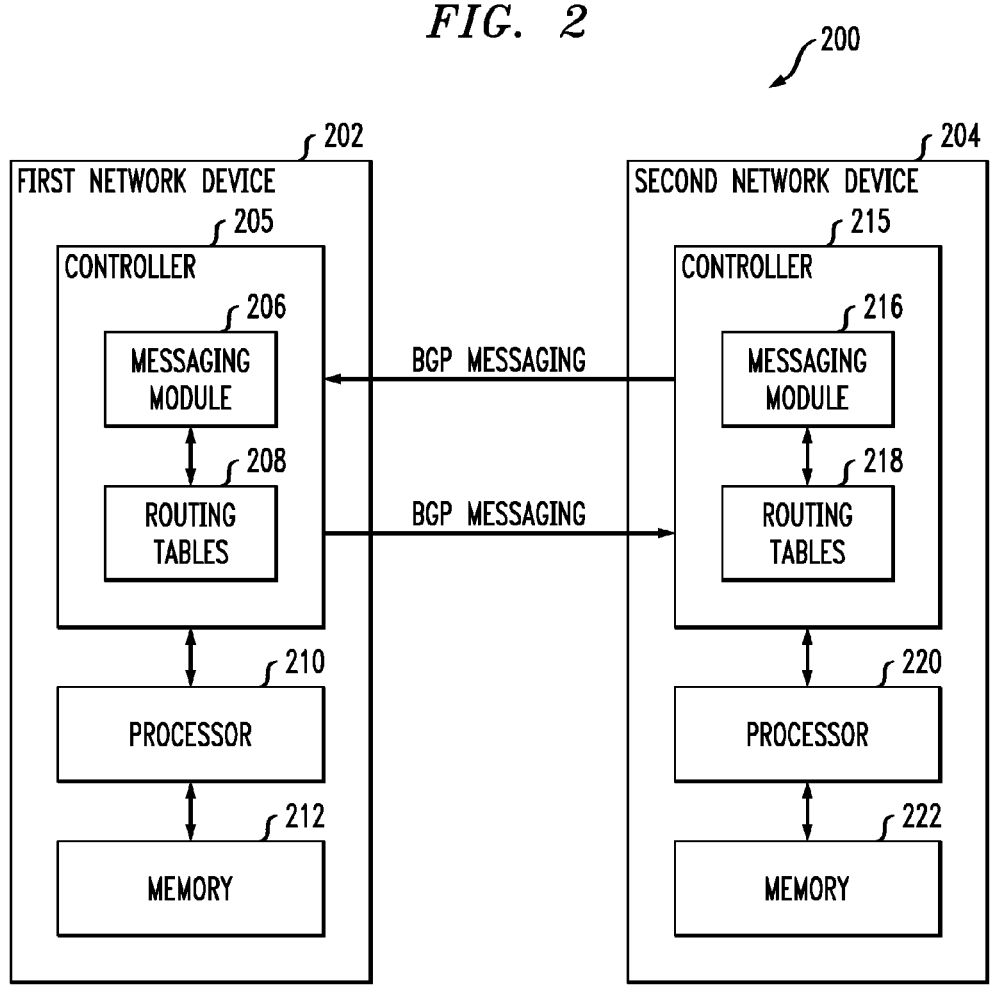
FIG. 2 is a more detailed view of first and second network devices in one possible implementation of the FIG. 1 network.

Referring initially to FIG. 2, a portion 200 of the network 100 includes first and second network devices 202 and 204. It is assumed that the first network device 202 corresponds to a multicast sender such as PE5 and that the second network device 202 corresponds to one of the multicast receivers PE1 through PE3, although other configurations are possible. For example, a given network device can operate as a multicast sender with respect to one multicast and as a multicast receiver with respect to another multicast. Accordingly, a given network device as that term is broadly used herein may comprise both multicast sender and multicast receiver functionality.

In the FIG. 2 embodiment, the first network device 202 is adapted for communication with the second network device 204, and vice versa. The first network device 202 comprises a controller 205 that includes a messaging module 206 coupled to routing tables 208. The first network device 202 further comprises a processor 210 coupled to the controller 205 and to a memory 212. The second network device 204 comprises a controller 215 that includes a messaging module 216 coupled to routing tables 218. The second network device 204 further comprises a processor 220 coupled to the controller 215 and to a memory 222.

Also in the FIG. 2 embodiment, BGP messages are exchanged between the controllers 205 and 215 utilizing the messaging modules 206 and 216. These elements are assumed to implement MVPN functionality similar to that described in the above-cited RFC 6513 and 6514, but suitably modified to support functionality for tracking of multicast receivers and switching of multicast traffic as disclosed herein.

Although network devices 202 and 204 are shown adjacent to one another in the figure, this is for simplicity and clarity of illustration only, and these network devices may of course communicate with one another through one or more additional network devices that are not explicitly shown. For example, network devices 202 and 204 may illustratively correspond to respective PE elements PE5 and PE1 of FIG. 1, which communicate with one another via other network devices including one or more network devices associated with each of core 104 and BGP RR 105.

It is also to be appreciated that the particular arrangement of network device components shown in FIG. 2 is exemplary only, and numerous alternative network device configurations may be used in other embodiments. For example, the network devices can be configured to incorporate support for numerous other types of messaging in accordance with other communication protocols.

Figure 3:
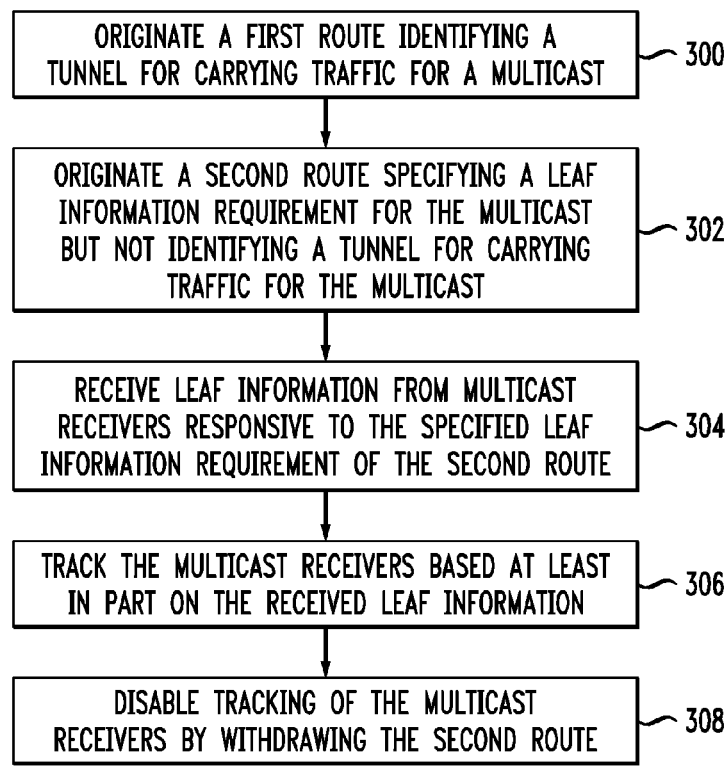
FIG. 3 is a flow diagram of an exemplary process carried out by one of the network devices of FIG. 2 operating as a multicast sender.
Figure 4:
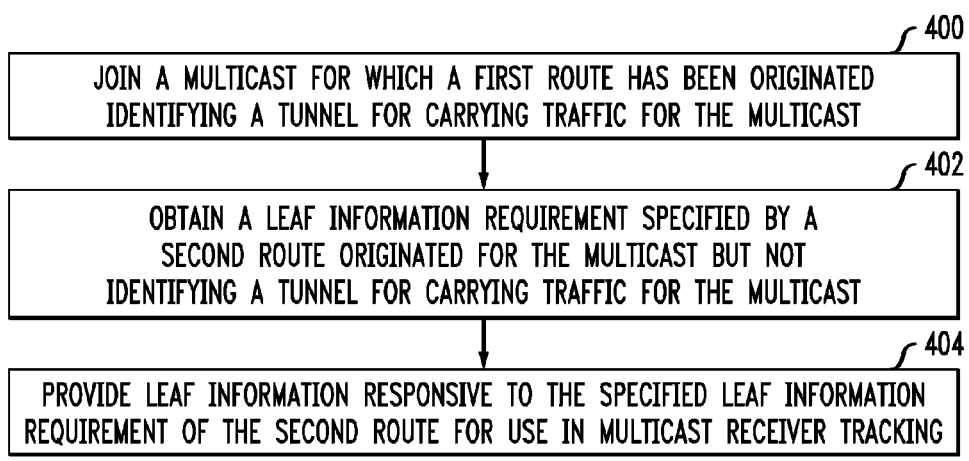
FIG. 4 is a flow diagram of an exemplary process carried out by one of the network devices of FIG. 2 operating as a multicast receiver.

Exemplary processes associated with multicast receiver tracking involving first and second network devices 202 and 204 will now be described with reference to FIGS. 3 and 4. More particularly, the process of FIG. 3 is assumed to be carried out by the first network device 202 operating as a multicast sender such as PE5, and the process of FIG. 4 is assumed to be carried out by the second network device 204 operating as a multicast receiver such as PE1 through PE3. As noted above, it is assumed that PE4 does not wish to join the multicast.

Referring now to FIG. 3, the process as illustrated includes steps 300 through 308 that are performed by the first network device 202 utilizing its controller 205 and associated messaging module 206 and routing tables 208.

In step 300, the first network device 202 originates a first route identifying a tunnel for carrying traffic for a multicast.

The first route illustratively comprises an inclusive route having a tunnel attribute that identifies an inclusive tunnel for the multicast. For example, the first route may comprise an I-PMSI A-D route having a tunnel attribute that identifies an I-PMSI tunnel. Other types of tunnels can be used in other embodiments.

In step 302, the first network device 202 originates a second route specifying a leaf information requirement for the multicast but not identifying a tunnel for carrying traffic for the multicast.

The second route illustratively comprises a selective route having a tunnel attribute configured to indicate that it carries no tunnel information. For example, the second route may comprise an S-PMSI A-D route having a tunnel attribute that does not identify an S-PMSI tunnel. The tunnel attribute of the selective route may be configured to indicate that it carries no tunnel information by setting a tunnel type field of the tunnel attribute to a predetermined value.

The specified leaf information requirement of the second route is illustratively established by setting a leaf information field of the tunnel attribute of the second route to a predetermined value. More particularly, the leaf information field of the tunnel attribute of the second route may comprise a leaf information required flag that is set to a logic one value by the first network device 202 to indicate the specified leaf information requirement.

Figure 5A:
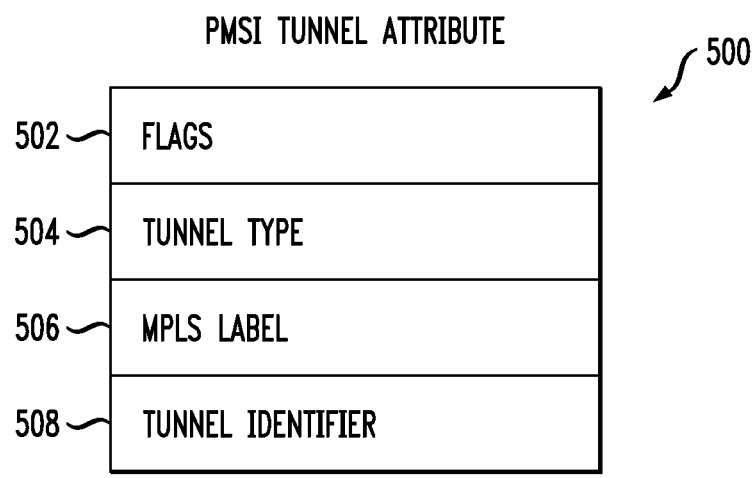
FIGS. 5A and 5B illustrate exemplary respective tunnel attribute and flag field formats utilized in conjunction with the processes of FIGS. 3 and 4.

An exemplary format for a PMSI tunnel attribute 500 is shown in FIG. 5A. This tunnel attribute format can be used for both I-PMSI A-D routes and S-PMSI A-D routes. The PMSI tunnel attribute 500 in this exemplary format comprises a flags field 502, a tunnel type field 504, an MPLS label field 506 and a tunnel identifier field 508.

Figure 5B:
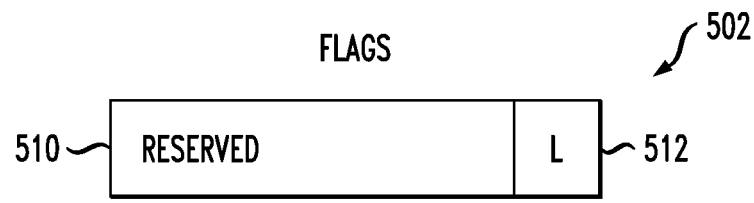

FIG. 5B shows the format of the flags field 502 in more detail. In this exemplary format, the flags field 502 comprises a plurality of reserved flags 510 and an L flag 512. The L flag 512 is the above-noted leaf information required flag, and is a single-bit flag indicating whether or not leaf information is required for the corresponding PMSI tunnel.

It is to be appreciated that the particular formats shown in FIGS. 5A and 5B are examples only, and other tunnel attribute formats can be used in other embodiments.

Referring again to FIG. 3, in step 304, the first network device 202 receives leaf information from a plurality of multicast receivers responsive to the specified leaf information requirement of the second route. The second network device 204 is assumed to be one of the multicast receivers.

The leaf information received from a given one of the multicast receivers responsive to the specified leaf information requirement of the second route illustratively comprises information associated with a leaf A-D route originated by the given multicast receiver responsive to the specified leaf information requirement.

Moreover, responsive to the specified leaf information requirement, the given multicast receiver does not establish a forwarding path to the second route.

In step 306, the first network device 202 tracks a plurality of receivers of the multicast based at least in part on the leaf information received from the multicast receivers responsive to the specified leaf information requirement of the second route.

The multicast receivers tracked by the first network device 202 illustratively comprise respective PE elements that have joined the multicast by issuing a multicast join message, such as PE elements PE1, PE2 and PE3 of FIG. 1. Other PE elements such as PE4 that have not issued multicast join messages do not send leaf information responsive to the specified leaf information requirement of the second route, and therefore are not tracked as multicast receivers by the first network device 202.

Such an arrangement allows the multicast sender to identify and track the appropriate multicast receivers, thereby avoiding problematic situations in which multicast traffic is sent to PE elements that do not join the multicast. For example, the multicast sender is able to identify and track the multicast receivers without switching the multicast traffic to a selective tunnel.

The multicast sender can utilize information relating to the tracked multicast receivers in order to determine whether or not to switch the multicast traffic from an inclusive tunnel to a selective tunnel. For example, if there are 100 PE elements in the communication network and 99 of them are determined to be multicast receivers using steps 300 through 306 of the FIG. 3 process, it will likely be more efficient for the multicast sender to continue to send multicast traffic over the inclusive tunnel. However, if only a relatively small number of the 100 PE elements are determined to be multicast receivers, the multicast sender can switch the multicast traffic to a selective tunnel by re-originating the second route with the selective tunnel identified in its tunnel attribute.

In step 308, the first network device 202 disables tracking of the multicast receivers by withdrawing the second route.

As indicated above, it is possible in some embodiments to use the second route to convey tunnel information after at least one iteration of steps 300 through 306 of the FIG. 3 process. For example, the first network device 202 in some embodiments switches traffic for the multicast from the tunnel identified by the first route to a tunnel identified by the second route by updating the second route to identify a tunnel for carrying traffic for the multicast. In such an arrangement, the first network device 202 may then subsequently switch traffic for the multicast from the tunnel identified by the second route back to the tunnel identified by the first route by again updating the second route, this time such that the second route no longer identifies a tunnel for carrying traffic for the multicast.

Referring now to FIG. 4, the process as illustrated includes steps 400 through 404 that are performed by the second network device 204 utilizing its controller 215 and associated messaging module 216 and routing tables 218.

In step 400, the second network device 204 joins a multicast for which a first route has been originated identifying a tunnel for carrying traffic for the multicast. This is the multicast for which the first route is originated by the first network device 202 in step 300 of FIG. 3.

In step 402, the second network device 204 obtains a leaf information requirement specified by a second route originated for the multicast but not identifying a tunnel for carrying traffic for the multicast. This is the second route originated by the first network device 202 in step 302 of FIG. 3.

In step 404, the second network device 204 provides leaf information responsive to the specified leaf information requirement of the second route for use in multicast receiver tracking. As noted above, this illustratively involves originating a leaf A-D route responsive to the specified leaf information requirement. Also, the leaf information is provided without establishing a forwarding path to the second route.

The leaf information provided by the second network device 204 and the other multicast receivers collectively comprises the leaf information received by the first network device 202 in step 304 of FIG. 3.

The second network device 204 may subsequently receive a prune message relating to the multicast, and withdraw the leaf A-D route responsive to the prune message.

Also, the second network device 204 can switch between tunnels for the multicast based on updates to the second route made by the first network device 202. For example, the second network device can switch from the tunnel identified by the first route to a tunnel identified by the second route responsive to updating of the second route to identify a tunnel for carrying traffic for the multicast.

In such an arrangement, the second network device 204 can subsequently switch from the tunnel identified by the second route back to the tunnel identified by the first route responsive to further updating of the second route by the first network device 202 such that the second route no longer identifies a tunnel for carrying traffic for the multicast.

In the embodiments of FIGS. 3 and 4, use of the second route to specify a leaf information requirement allows the multicast sender to determine the multicast receivers in a particularly accurate and efficient manner. This advantageously allows the multicast sender to determine whether or not to switch multicast traffic from an inclusive tunnel to a selective tunnel. For example, responsive to a determination that PE1, PE2 and PE3 are the actual multicast receivers in the FIG. 1 embodiment, PE5 can switch the multicast traffic from an inclusive tunnel for which PE4 receives the multicast traffic to a selective tunnel for which PE4 will not receive the multicast traffic. This conserves network resources and enhances network performance.

The particular process steps and other operations described above in conjunction with the flow diagrams of FIGS. 3 and 4 are exemplary only, and additional or alternative process steps or operations may be used in other embodiments. For example, certain steps shown serially in the figures can in some situations be performed at least in part in parallel with one another. Moreover, although the steps of the FIG. 3 process are described as being performed by first processing device 202 and the steps of the FIG. 4 process are described as being performed by the second processing device 204, this is by way of illustrative example, and these processes or portions thereof can each be performed by other network devices. Also, it is possible that a given one of the processes can be performed in part by one network device and in part by another network device.

One possible application of the exemplary processes of FIGS. 3 and 4 will now be described with reference to the PE elements 110-1 through 110-5 of FIG. 1. As noted previously, in this example, PE5 is assumed to be a multicast sender and PE1 through PE3 are assumed to be respective multicast receivers. It is also assumed in the context of this example that PE4 does not wish to join the multicast, as indicated by its lack of an associated multicast join message in FIG. 1. Finally, it is assumed that the multicast sender PE5 originates an I-PMSI A-D route that identifies an I-PMSI tunnel for carrying traffic for the (S, G) multicast.

In order to track the multicast receivers for the (S, G) multicast, PE5 also originates an S-PMSI A-D route having a tunnel attribute with its leaf information required flag set to a logic one value and its tunnel type field set to indicate that it carries no tunnel information. Accordingly, this S-PMSI A-D route does not identify an S-PMSI tunnel for carrying traffic for the multicast.

Responsive to the leaf information required flag, the multicast receivers PE1, PE2 and PE3 will each originate a leaf A-D route but will not set up a forwarding path to the S-PMSI A-D route. However, PE4 will not originate a leaf A-D route. This allows PE5 to identify and track the multicast receivers PE1, PE2 and PE3. As noted above, PE5 can switch the multicast traffic from an inclusive tunnel for which PE4 receives the multicast traffic to a selective tunnel for which PE4 will not receive the multicast traffic, thereby avoiding the transmission of multicast traffic to PE4.

If any of the multicast receivers PE1, PE2 or PE3 later receives a prune message for the (S, G) multicast, that PE element will withdraw the leaf A-D route that it previously originated. This allows PE5 to continue to accurately track the current set of multicast receivers as receivers leave the multicast. PE5 can then adjust the tunnel type as appropriate based on the remaining multicast receivers.

If PE5 decides to switch the multicast traffic from the I-PMSI tunnel to an S-PMSI tunnel, it updates the S-PMSI A-D route such that its tunnel attribute identifies the S-PMSI tunnel, and then re-originates the updated S-PMSI A-D route.

The multicast receivers will see the updated S-PMSI tunnel attribute and will set up their forwarding paths for the multicast to receive traffic from the tunnel advertised in the updated S-PMSI A-D route. Tracking may then subsequently be disabled in this scenario by re-originating the S-PMSI A-D route with the leaf information required flag being reset to a logic zero value but with all other information unchanged. However, for certain protocols in which tunnels are built from root to leaf, such as RSVP, tracking would generally not be disabled in this scenario.

If PE5 subsequently decides to switch traffic back to the I-PMSI tunnel, it updates the S-PMSI A-D route to set the tunnel type to again indicate that it carries no tunnel information. The multicast receivers will then set up their forwarding paths for the multicast to receive traffic from the I-PMSI tunnel.

The above-described operations associated with application of the processes of FIGS. 3 and 4 to the PE elements 110 of FIG. 1 are presented by way of illustrative example only, and other operations may be used to implement these or similar processes in other embodiments.

Referring again to FIG. 2, the network devices 202 and 204 implementing the respective processes of FIGS. 3 and 4 comprise respective processors 210 and 220 and respective memories 212 and 222. The processor 210 or 220 of such a network device may be implemented utilizing a microprocessor, a microcontroller, an application-specific integrated circuit (ASIC), a field-programmable gate array (FPGA), or other type of processing circuitry, as well as portions or combinations of such processing circuitry. The processor may include one or more embedded memories as internal memories.

The processor 210 or 220 and any associated internal or external memory may be used in storage and execution of one or more software programs for controlling the operation of the corresponding network device 202 or 204. Accordingly, one or more of the modules 206 and 208 of controller 205 in network device 202, one or more of the modules 216 and 218 of controller 215 in network device 204, or portions of these modules, may be implemented at least in part using such software programs.

Each of the memories 212 and 222 of the network devices 202 and 204 is assumed to include one or more storage areas that may be utilized for program code storage. The memory 212 or 222 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Articles of manufacture comprising such computer program products or other processor-readable storage media are considered embodiments of the invention.

The memory 212 or 222 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM).

The term "memory" as used herein is intended to be broadly construed, and may additionally or alternatively encompass, for example, a read-only memory (ROM), a disk-based memory, or other type of storage device, as well as portions or combinations of such devices.

The processor, memory, controller and other components of a given network device of communication network 100 may include well-known circuitry suitably modified to implement at least a portion of the multicast receiver tracking and related multicast traffic switching functionality described above. Conventional aspects of such circuitry are well known to those skilled in the art and therefore will not be described in detail herein.

It is to be appreciated that the particular arrangement of network device components shown in FIG. 2 is exemplary only, and numerous alternative network device configurations may be used in other embodiments. For example, the network devices can be configured to incorporate additional or alternative components and to support other communication protocols.

As mentioned above, embodiments of the present invention may be implemented in the form of articles of manufacture each comprising one or more software programs that are executed by processing circuitry of a network device or other processing device of a communication network.

Also, embodiments of the present invention may be implemented in one or more ASICS, FPGAs or other types of integrated circuit devices, in any combination. Such integrated circuit devices, as well as portions or combinations thereof, are examples of "circuitry" as that term is used herein.

A wide variety of other arrangements of hardware and associated software or firmware may be used in implementing embodiments of the invention.

Although certain illustrative embodiments are described herein in the context of particular communication protocols such as IP, BGP and MPLS, other types of networks can be used in other embodiments. The term "network" as used herein is therefore intended to be broadly construed.

It should again be emphasized that the embodiments described above are for purposes of illustration only, and should not be interpreted as limiting in any way. Other embodiments may use different types of network, device and module configurations, and alternative communication protocols and process steps for implementing multicast receiver tracking and related multicast traffic switching functionality in a communication network. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. An apparatus comprising:
a first network device adapted for communication with one or more other network devices;
the first network device comprising a processor coupled to a memory;
the first network device being configured:
to originate a first route identifying a first tunnel for carrying traffic for a multicast;
to originate a second route specifying a leaf information requirement for the multicast but not initially identifying any tunnel for carrying traffic for the multicast; and
to track a plurality of receivers of the multicast based at least in part on leaf information received from the multicast receivers responsive to the specified leaf information requirement of the second route;
wherein the first route comprises an inclusive route having a first tunnel attribute that identifies the first tunnel as an inclusive tunnel for the multicast and the second route comprises a selective route having a second tunnel attribute configured to indicate that it carries no tunnel information;
wherein the second tunnel attribute of the selective route is configured to indicate that it carries no tunnel information by setting a tunnel type field of the second tunnel attribute to a predetermined value; and
wherein the first network device is further configured to switch traffic for the multicast from the first tunnel identified by the first route to a second tunnel by updating the second route to identify the second tunnel for carrying traffic for the multicast.

2. The apparatus of claim 1 wherein the specified leaf information requirement of the second route is established by setting a leaf information field of the second tunnel attribute of the second route to a predetermined value.

3. The apparatus of claim 2 wherein the leaf information field of the second tunnel attribute of the second route comprises a leaf information required flag that is set to a logic one value to indicate the specified leaf information requirement.

4. The apparatus of claim 1 wherein the leaf information received from a given one of the multicast receivers responsive to the specified leaf information requirement of the second route comprises information associated with a leaf auto-discovery route originated by the given multicast receiver responsive to the specified leaf information requirement.

5. The apparatus of claim 4 wherein the specified leaf information requirement provides an indication to the given multicast receiver that it should not establish a forwarding path to the second route.

6. The apparatus of claim 1 wherein the first network device is further configured to switch traffic for the multicast from the second tunnel back to the tunnel identified by the first route by updating the second route so as to no longer identify the second tunnel for carrying traffic for the multicast.

7. The apparatus of claim 1 wherein the first network device is further configured to disable tracking of the multicast receivers by withdrawing the second route.

8. A communication network comprising the apparatus of claim 1.

9. A method comprising:
originating a first route identifying a first tunnel for carrying traffic for a multicast;
originating a second route specifying a leaf information requirement for the multicast but not initially identifying any tunnel for carrying traffic for the multicast; and
tracking a plurality of receivers of the multicast based at least in part on leaf information received from the multicast receivers responsive to the specified leaf information requirement of the second route;
wherein the originating first and second routes and the tracking are performed by a network device;
wherein the first route comprises an inclusive route having a first tunnel attribute that identifies the first tunnel as an inclusive tunnel for the multicast and the second route comprises a selective route having a second tunnel attribute configured to indicate that it carries no tunnel information;

wherein the second tunnel attribute of the selective route is configured to indicate that it carries no tunnel information by setting a tunnel type field of the second tunnel attribute to a predetermined value; and wherein the method further comprises switching traffic for the multicast from the first tunnel identified by the first route to a second tunnel by updating the second route to identify the second tunnel for carrying traffic for the multicast.

10. The method of claim 9 further comprising disabling the tracking of the multicast receivers by withdrawing the second route.

11. An article of manufacture comprising a non-transitory processor-readable storage medium having embodied therein executable program code that when executed by a network device causes the network device:

to originate a first route identifying a first tunnel for carrying traffic for a multicast;

to originate a second route specifying a leaf information requirement for the multicast but not initially identifying any tunnel for carrying traffic for the multicast; and to track a plurality of receivers of the multicast based at least in part on leaf information received from the multicast receivers responsive to the specified leaf information requirement of the second route;

wherein the first route comprises an inclusive route having a first tunnel attribute that identifies the first tunnel as an inclusive tunnel for the multicast and the second route comprises a selective route having a second tunnel attribute configured to indicate that it carries no tunnel information;

wherein the second tunnel attribute of the selective route is configured to indicate that it carries no tunnel information by setting a tunnel type field of the second tunnel attribute to a predetermined value; and wherein the program code when executed by the network device further causes the network device to switch traffic for the multicast from the first tunnel identified by the first route to a second tunnel by updating the second route to identify the second tunnel for carrying traffic for the multicast.

12. The article of claim 11 wherein the program code when executed by the network device further causes the network device to disable the tracking of the multicast receivers by withdrawing the second route.

13. An apparatus comprising:

a first network device adapted for communication with one or more other network devices;

the first network device comprising a processor coupled to a memory;

the first network device being configured:

to join a multicast for which a first route has been originated identifying a first tunnel for carrying traffic for the multicast;

to obtain a leaf information requirement specified by a second route originated for the multicast but not initially identifying any tunnel for carrying traffic for the multicast; and to provide leaf information responsive to the specified leaf information requirement of the second route for use in multicast receiver tracking;

wherein the first route comprises an inclusive route having a first tunnel attribute that identifies the first tunnel as an inclusive tunnel for the multicast and the second route comprises a selective route having a second tunnel attribute configured to indicate that it carries no tunnel information;

wherein the second tunnel attribute of the selective route is configured to indicate that it carries no tunnel information by setting a tunnel type field of the second tunnel attribute to a predetermined value; and wherein the first network device is further configured to switch from the first tunnel identified by the first route to a second tunnel responsive to updating of the second route to identify the second tunnel for carrying traffic for the multicast.

14. The apparatus of claim 13 wherein the first network device is further configured to switch from the second tunnel back to the first tunnel identified by the first route responsive to further updating of the second route to no longer identify the second tunnel for carrying traffic for the multicast.

15. A method comprising:

joining a multicast for which a first route has been originated identifying a first tunnel for carrying traffic for the multicast;

obtaining a leaf information requirement specified by a second route originated for the multicast but not initially identifying any tunnel for carrying traffic for the multicast; and providing leaf information responsive to the specified leaf information requirement of the second route for use in multicast receiver tracking;

wherein the joining, obtaining and providing are performed by a network device;

wherein the first route comprises an inclusive route having a first tunnel attribute that identifies the first tunnel as an inclusive tunnel for the multicast and the second route comprises a selective route having a second tunnel attribute configured to indicate that it carries no tunnel information;

wherein the second tunnel attribute of the selective route is configured to indicate that it carries no tunnel information by setting a tunnel type field of the second tunnel attribute to a predetermined value; and wherein the method further comprises switching from the first tunnel identified by the first route to a second tunnel responsive to updating of the second route to identify the second tunnel for carrying traffic for the multicast.

16. The method of claim 15 wherein providing leaf information responsive to the specified leaf information requirement comprises originating a leaf auto-discovery route responsive to the specified leaf information requirement.

17. The method of claim 16 further comprising:

receiving a prune message relating to the multicast; and withdrawing the leaf auto-discovery route responsive to the prune message.

18. The method of claim 15 wherein providing leaf information responsive to the specified leaf information requirement comprises providing the leaf information without establishing a forwarding path to the second route.

19. The method of claim 15 further comprising switching from the second tunnel back to the first tunnel identified by the first route responsive to further updating of the second route to no longer identify the second tunnel for carrying traffic for the multicast.

20. An article of manufacture comprising a non-transitory processor-readable storage medium having embodied therein executable program code that when executed by a network device causes the network device:

to join a multicast for which a first route has been originated identifying a first tunnel for carrying traffic for the multicast;

to obtain a leaf information requirement specified by a second route originated for the multicast but not initially identifying any tunnel for carrying traffic for the multicast; and to provide leaf information responsive to the specified leaf information requirement of the second route for use in multicast receiver tracking;

wherein the first route comprises an inclusive route having a first tunnel attribute that identifies the first tunnel as an inclusive tunnel for the multicast and the second route comprises a selective route having a second tunnel attribute configured to indicate that it carries no tunnel information;

wherein the second tunnel attribute of the selective route is configured to indicate that it carries no tunnel information by setting a tunnel type field of the second tunnel attribute to a predetermined value; and wherein the program code when executed by the network device further causes the network device to switch from the first tunnel identified by the first route to a second tunnel responsive to updating of the second route to identify the second tunnel for carrying traffic for the multicast.

21. The article of claim 20 wherein the program code when executed by the network device further causes the network device to switch from the second tunnel back to the first tunnel identified by the first route responsive to further updating of the second route to no longer identify the second tunnel for carrying traffic for the multicast.

* * * * *